Patented Oct. 26, 1926.

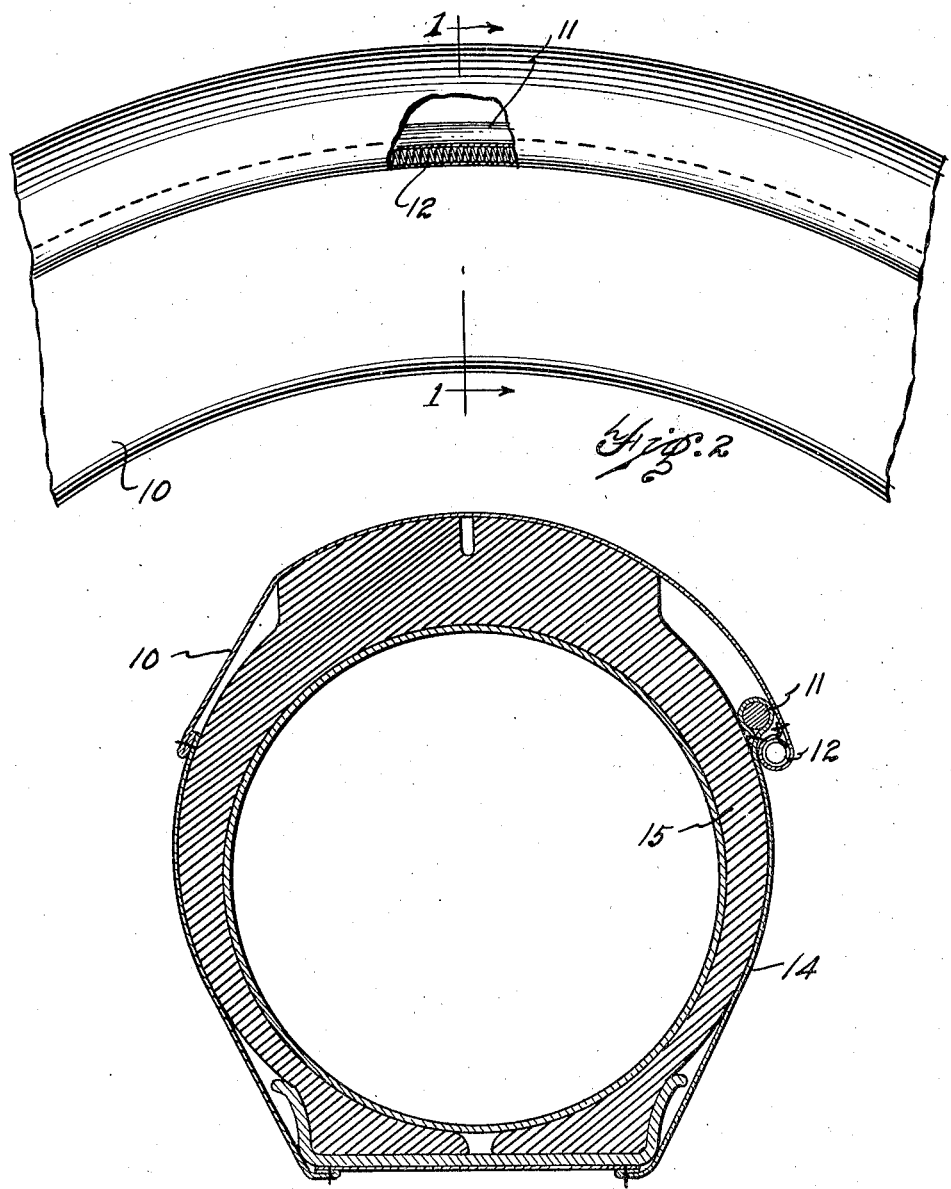

1,604,527

UNITED STATES PATENT OFFICE.

THOMAS J. McCORMICK, OF DETROIT, MICHIGAN.

TIRE COVER.

Application filed November 21, 1925. Serial No. 70,455.

The present invention relates to tire covers and particularly to that type of cover in which a tire is completely enclosed to protect the tire from the action of light and the weather.

Among the objects of the invention is a cover which is easy to apply and remove and which will present a better appearance than those now in use.

Another object is to decrease the cost of construction of such covers and at the same time produce a cover which is superior to others of similar types.

Heretofore, the best known type of tire cover which completely encloses a tire is one having sufficient fabric to extend from one side of the tread over the latter and around the tire to the other side of the tread, having two thicknesses of fabric over the tread, and having a contractible and expandible ring in each edge.

This form of cover is difficult to put on and take off of a tire and especially difficult to put on so as to present a good appearance, because of the difficulty in lapping over the one edge while keeping the under edge properly concentric.

Another object of the present invention, therefore, is to obviate this difficulty and produce a cover which shall always present a smooth, neat appearance.

Still another object is a cover which may be used for different makes of the same supposed size of tire.

Reference should be made to the accompanying drawing, in which:—

Fig. 1 is a cross section through a tire and cover therefor; and

Fig. 2 is an elevation of a part of a tire and cover with parts removed to show the construction of the cover.

As indicated in the drawing the cover consists of an annular tube of fabric 10 made up of suitable strips sewed together, which tube has an annular opening along one face of the tire, the diameter of the latter annulus being intermediate the inner and outer diameters of the annular tube.

The fabric edges of the opening will have reinforcing rings as indicated, the inner edge being reinforced with a ring 11 of substantially fixed diameter and preferably of metal rod, and the outer edge with an expandible and contractible ring 12, preferably a continuous spiral spring.

In the application of the cover to a tire, the ring 11 with the annulus 14 of fabric adjacent and secured thereto will lie against one face of the tire 15 and the remainder of the cover will be passed through the tire and brought around over the thread, the ring 12 allowing sufficient expansion for this operation. The outer ring 12 with the attached fabric is then brought down to overlap ring 11, thereby completely enclosing the tire in a light, water and dust-proof case.

The function of ring 11 is, of course, to hold the fabric ring 14 substantially smooth against the face of the tire and concentric therewith during the operation of applying the cover and for this purpose it should be relatively stiff. A certain degree of flexibility is, however, permissible.

In covering different makes of the supposed same size of tire, the only difference will be in the overlap of the edges of the opening.

The present form of cover is not only superior to the known cover but is cheaper in that the fabric used is less and the ring 11 is cheaper than the spring rings.

Further, the ring 11 and fabric annulus 14 position the cover during its application and it is therefore easy to apply properly, with the rings 11 and 12 upon the rearward face of the tire, presenting to ordinary view the smooth fabric on the side opposite the rings.

Having now described the invention and the preferred form of embodiment thereof, it is to be understood that the invention is to be limited not to the specific details herein set forth but only by the scope of the claims which follow.

I claim:—

1. A tire cover consisting of an annular sheet of fabric, the edges of which are adapted to overlap at one side of the tire between the tread and bead portions and means for maintaining the one edge concentric with the tire during overlapping of the other edge.

2. A tire cover consisting of an annular sheet of fabric, the edges of which are adapted to overlap at one side of the tire between the tread and bead portions and resilient means for maintaining the edges in engagement when said cover encloses a tire.

3. A tire cover consisting of an annular sheet of fabric, having fixed to one edge a reinforcing ring of substantially fixed diameter intermediate the rim and tread diameters of the tire, the edges of said sheet adapted to overlap at one side of the tire, and an extensible and contractible reinforcing ring secured to the other edge of said sheet and adapted to hold said second named edge in overlapping relation to said first named edge.

4. In a tire cover, a substantially flat annulus of fabric having in its outer edge a fixed diameter ring, said annulus and ring adapted to lie against one side wall of a tire with the ring inside of the line of tread, additional fabric secured to said annulus adapted to extend around the tire and overlap said fixed diameter ring, and an expandible and contractible ring in the overlapping edge of said fabric.

5. A tire cover consisting of an annular sheet of fabric made up of a plurality of fabric strips one of which is a substantially flat ring or sufficient width to extend from the flat inner surface of the tire to near the tread thereof and has its outer edge provided with a comparatively stiff ring, other strips sewed together and to said fabric ring at its inner edge to cover the rest of the tire and lap over the outer edge of said first ring, the lapping edge being provided with a ring of extensible material.

THOMAS J. McCORMICK.